US010062206B2

(12) United States Patent
Prokopenko et al.

(10) Patent No.: US 10,062,206 B2
(45) Date of Patent: Aug. 28, 2018

(54) PARALLEL MICROPOLYGON RASTERIZERS

(71) Applicant: Advanced Micro Devices, Inc., Sunnyvale, CA (US)

(72) Inventors: Boris Prokopenko, Sunnyvale, CA (US); Timour T. Paltashev, Sunnyvale, CA (US); Vladimir V. Kibardin, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 31 days.

(21) Appl. No.: 15/251,914

(22) Filed: Aug. 30, 2016

(65) Prior Publication Data

US 2018/0061124 A1   Mar. 1, 2018

(51) Int. Cl.
  *G06T 17/20*   (2006.01)
  *G06T 17/10*   (2006.01)
  *G06T 15/00*   (2011.01)

(52) U.S. Cl.
  CPC ............ *G06T 17/20* (2013.01); *G06T 15/005* (2013.01); *G06T 17/10* (2013.01); *G06T 2210/12* (2013.01)

(58) Field of Classification Search
  None
  See application file for complete search history.

(56) References Cited

U.S. PATENT DOCUMENTS

| 5,977,977 | A | 11/1999 | Kajiya et al. |
| 7,675,521 | B2 | 3/2010 | Iourcha et al. |
| 8,704,836 | B1 | 4/2014 | Rhoades et al. |
| 8,970,584 | B1 | 3/2015 | Aila et al. |
| 2003/0234792 | A1* | 12/2003 | Junkins ............... G06T 17/20 345/582 |
| 2010/0128314 | A1* | 5/2010 | Loce .................. G06K 15/02 358/3.06 |
| 2014/0152675 | A1* | 6/2014 | Martin ............... G06T 17/20 345/506 |
| 2015/0294498 | A1 | 10/2015 | Mei et al. |

OTHER PUBLICATIONS

Fatahalian, Kayvon, "Evolving the Direct3D Pipeline for Real-Time Micronpolygon Rendering," Beyond Programmable Shading Course, ACM SIGGRAPH 2010, Stanford University, Jul. 29, 2010, 62 pages.
U.S. Appl. No. 14/984,896, filed Dec. 30, 2015, listing Timour T. Paltashev et al. as inventors, entitled "Method and Apparatus for Performing High Throughput Tessellation".
International Search Report and Written Opinion dated Jan. 23, 2018 for PCT Application No. PCT/US2017/049151, 12 pages.

* cited by examiner

*Primary Examiner* — Michelle Chin

(57) ABSTRACT

A parallel adaptable graphics rasterization system in which a primitive assembler includes a router to selectively route a primitive to a first rasterizer or one of a plurality of second rasterizers. The second rasterizers concurrently operate on different primitives and the primitive is selectively routed based on an area of the primitive. In some variations, a bounding box of the primitive is reduced to a predetermined number of pixels prior to providing the primitive to the one of the plurality of second rasterizers. Reducing the bounding box can include subtracting an origin of the bounding box from coordinates of points that represent the primitive.

20 Claims, 9 Drawing Sheets

PARALLEL MICROPOLYGON RASTERIZERS

BACKGROUND

Description of the Related Art

Graphics processing systems generate images of scenes that are represented by models that can be created and manipulated by the processing system. Objects in a 3-D model of a scene are typically represented by sets of patches (such as Bezier patches) that are high order surfaces defined by a set of control points. The patches are processed by a graphics pipeline to produce images for display on the screen. A conventional graphics pipeline for processing 3-D graphics is divided into a portion that handles geometry workloads and a portion that handles pixel workloads. The portion that handles the geometry workload is referred to as operating in object space and the portion that handles the pixel workloads is referred to as operating in image space. The geometry portion of the graphics pipeline includes a geometry front-end that processes higher-order primitives (e.g., the patches), a tessellator that receives the higher-order primitives and generates lower-order primitives from the input higher-order primitives, and a geometry back-end including a rasterizer that processes the lower-order primitives and converts them to pixels in image space. The lower-order primitives include polygons such as quadrilaterals, triangles, lines, points, and the like that are formed of interconnected vertices. The lower-order primitives are interconnected to form a mesh that represents various objects in the scene.

BRIEF DESCRIPTION OF THE DRAWINGS

The present disclosure can be better understood, and its numerous features and advantages made apparent to those skilled in the art by referencing the accompanying drawings. The use of the same reference symbols in different drawings indicates similar or identical items.

DETAILED DESCRIPTION

Figure 1A:
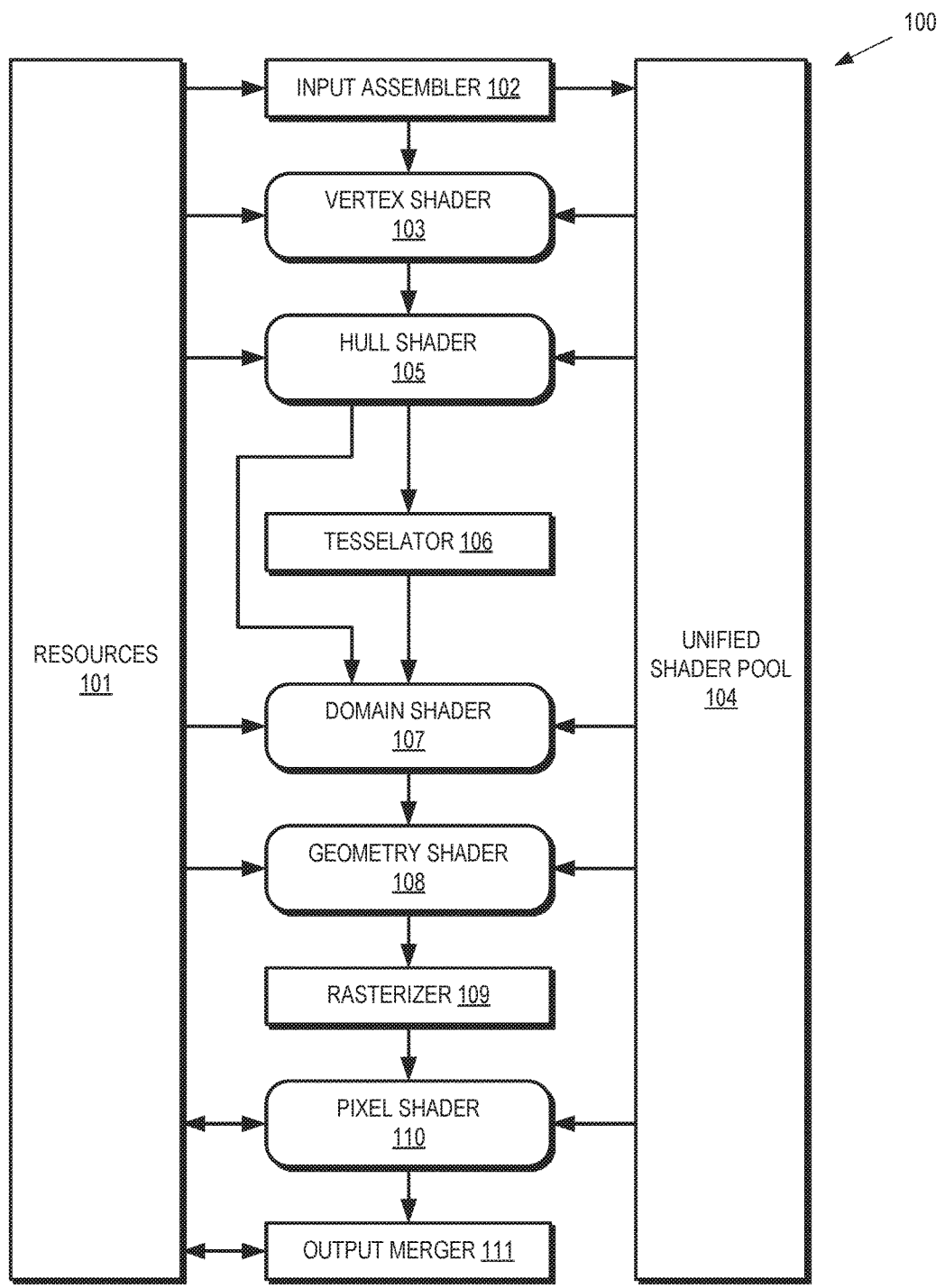
FIG. 1A is a block diagram of a first example graphics processing system according to some embodiments.

FIG. 1A depicts a first example graphics processing system according to some embodiments. The first example graphics processing system includes a graphics pipeline 100 that is capable of processing high-order geometry primitives to generate rasterized images of three-dimensional (3-D) scenes at a predetermined resolution. The graphics pipeline 100 has access to resources 101 such as one or more memories or caches that are used to implement buffers and store vertex data, texture data, and the like. An input assembler 102 is configured to access information from the resources 101 that is used to define objects that represent portions of a model of a scene. A vertex shader 103, which can be implemented in software, receives a single vertex of a primitive as input and outputs a single vertex. The graphics pipeline 100 implements a unified shader model so that all the shaders implemented in the graphics pipeline 100 have the same capabilities. The shaders, including the vertex shader 103, are therefore implemented using a common set of resources that is referred to herein as the unified shader pool 104. A hull shader 105 operates on input patches or control points that are used to define the input patches. The hull shader 105 outputs tessellation factors and other patch data.

Primitives generated by the hull shader 105 can optionally be provided to a tessellator 106. The tessellator 106 receives objects (such as patches) from the hull shader 106 and generates information identifying primitives corresponding to the input object, e.g., by tessellating the input objects based on tessellation factors provided to the tessellator 106 by the hull shader 105.

A domain shader 107 inputs a domain location and (optionally) other patch data. The domain shader 107 operates on the provided information and generates a single vertex for output based on the input domain location and other information. A geometry shader 108 receives an input primitive and outputs up to four primitives that are generated by the geometry shader 108 based on the input primitive. One stream of primitives is provided to a rasterizer 109 and up to four streams of primitives can be concatenated to buffers in the resources 101. The rasterizer 109 performs shading operations and other operations such as clipping, perspective dividing, scissoring, and viewport selection, and the like.

A pixel shader 110 inputs a single pixel and outputs zero or one pixel in response to the input pixel. An output merger block 111 performs blend, depth, stencil, or other operations on pixels received from the pixel shader 110.

In the graphics pipeline 100, tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive. The granularity of the tessellation can be configured based on a required level of detail, which is typically determined by the relative position of the object represented by the higher-order primitives and a camera that represents the viewpoint used to render the image of the scene including the object. Objects that are closer to the camera require higher levels of detail and objects that are further from the camera require lower levels of detail. Depending on the required level of detail, tessellation can increase the number of lower-order primitives in the graphics pipeline by orders of magnitude relative to the number of input higher-order primitives. Some of the primitives produced by the tessellator 105 are micropolygons that represent an area that is less than or approximately equal to the area of a single pixel on the image space or the screen used to display the rendered image.

The rasterizer 108 in the graphics pipeline 100 converts the vector information represented by the primitives generated by the tessellator 105 into a raster image composed of pixels that have values determined by the rasterizer 109 based on the input primitives. In some cases, the rasterizer 109 can be overwhelmed by the large volume of primitives generated by the tessellator 105, or any other source of primitives like a massively parallel compute shader program or an ultra-high speed data channel, particularly when the rasterizer 109 is operating on primitives that represent a portion of the scene that requires a high level of detail. The rasterizer 109 therefore becomes a bottleneck in the graphics pipeline 100 under these circumstances. The reduction in the pixel rate resulting from a bottleneck can noticeably degrade the frame rate and quality of the image received by a user. Furthermore, the rasterizer 109 is configured to operate on primitives that represent an area that is larger than the area of a single pixel. For example, the rasterizer 109 can be implemented using hardware sufficient to perform fixed-point operations on image coordinates that represent points or vertices of the polygons throughout the entire range of image space. In contrast, differences between micropolygons can be represented by a much smaller range of image coordinates. Rasterizing micropolygons using the rasterizer 109 is therefore an inefficient use of the resources of the graphics pipeline 100.

FIGS. 1B-9 disclose that bottlenecks created in a rasterizer by massive flow of primitives in a graphics pipeline can be improved upon, and the resources of the graphics pipeline deployed more efficiently, by selectively rasterizing primitives using a composite architecture that utilizes different sets of rasterizers (referred to herein as large rasterizers and small rasterizers) to process primitives depending on the area of the primitives. One example of the large rasterizer is configured to perform fixed-point operations on polygons within bounding boxes that could encompass the entire range of image space. The polygons are therefore represented by input coordinates in image space within a range represented by 16 to 24 bits. Consequently, in this example, the large rasterizer must be able to operate on intermediate results within a range represented by 40 to 48 bits. The small rasterizers only operate on primitives that are encompassed by smaller bounding boxes and do not possess sufficient processing capability to operate on primitives that are encompassed by larger bounding boxes. For example, primitives provided to the small rasterizers can be limited to polygons encompassed by an area corresponding to four pixels, e.g., a 2×2 quad of pixels. The range of input coordinates needed to represent the primitives provided to the small rasterizers (and intermediate results generated by the small rasterizers) is therefore represented by a smaller number of bits, e.g., 10-20 bits.

In some embodiments, a comparison of the area of a primitive to a threshold area of a bounding box is used to selectively provide the primitive to a large rasterizer or a small rasterizer. Primitives such as polygons that represent an area that is larger than the threshold area are rasterized using the large rasterizer and polygons that represent an area that is smaller than or equal to the threshold area are rasterized using one of the small rasterizers. The threshold area can be indicated by a predetermined number of pixels, which can be set to a number or arrangement of pixels that corresponds to capabilities of the small rasterizers. For example, the threshold area of the bounding box can be set to a 2×2 arrangement of pixels. In some cases, multiple different threshold areas can be used to selectively provide primitives to more than two types of rasterizers that have different processing capabilities. Bits in a primitive's image coordinates that are not needed to distinguish between different locations within a bounding box of the threshold area are dropped from the information provided to the small rasterizers. The number of bits needed for a rasterization computation in the small rasterizers can be further reduced by subtracting an origin of the bounding box from the image coordinates that are provided to the small rasterizers. In some embodiments, each of the small rasterizers is associated with a queue that stores values representative of characteristics of points or vertices of the polygons prior to rasterizing. Depths of the queues are chosen to compensate for latencies required to process the reduced range of image coordinates in the small rasterizers.

Figure 1B:
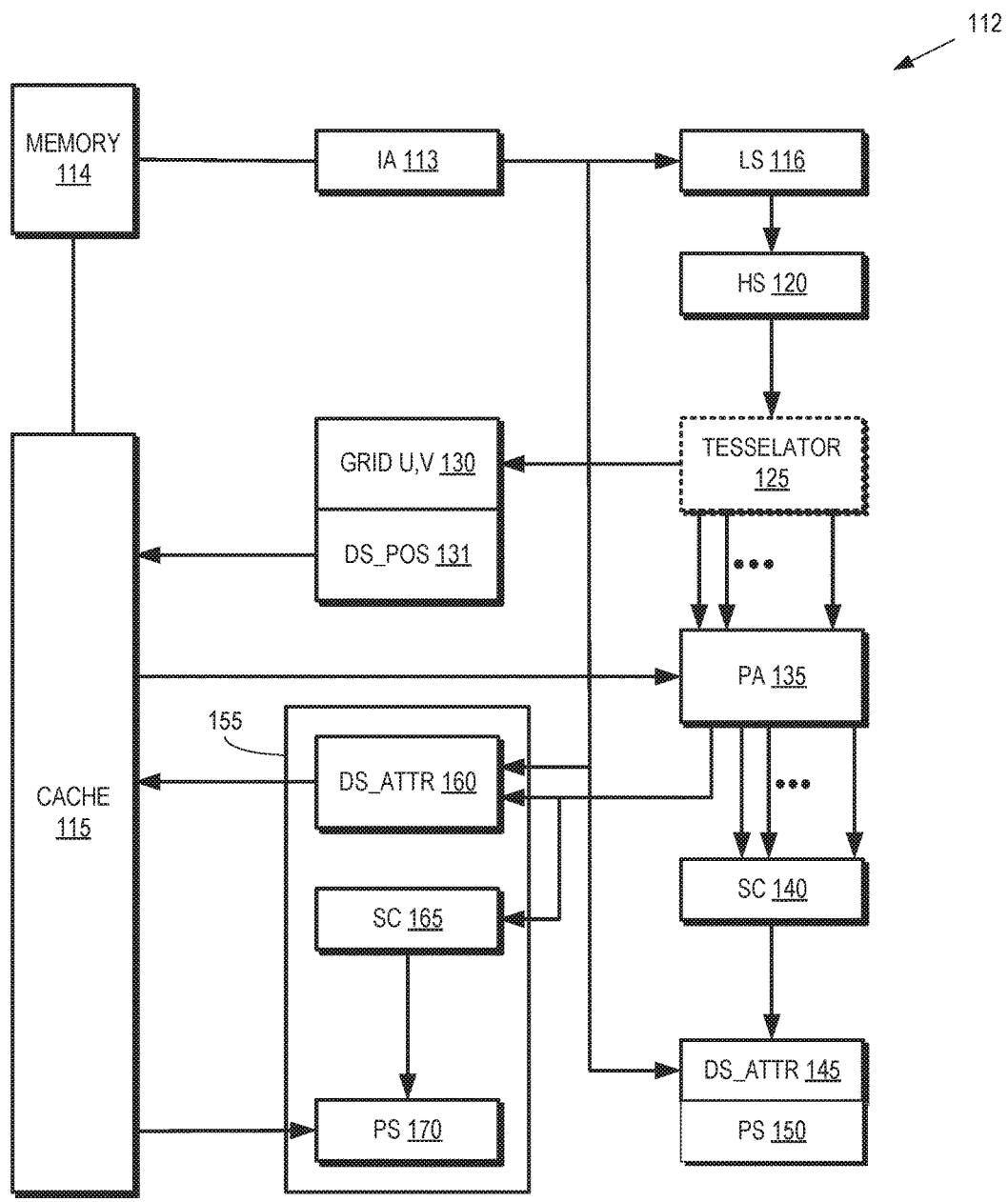
FIG. 1B is a block diagram of a second example graphics processing system according to some embodiments.

FIG. 1B is a block diagram of a second example graphics processing system 112 according to some embodiments. The graphics processing system 112 includes an input assembler (IA) 113 that accesses information used to define objects that represent portions of a model of a scene. For example, the input assembler 113 can access Bezier patches that are defined by one or more control points and used to represent portions of the model. For another example, the input assembler 113 can access vertices of primitives such as triangles representative of portions of the model. In some embodiments, the input assembler can also create work items for a graphics pipeline in the graphics processing system 112 and assign identifiers to the objects such as vertex identifiers, primitive identifiers, control point identifiers, and the like. In some variations, the objects can be accessed from a memory 114 in the graphics processing system 112. Some embodiments of the processing system 112 include a cache 115 that is used to cache information stored in the memory 114. In some cases, the cache 115 is a single level cache or a hierarchical cache that includes multiple levels such as an L1 cache, an L2 cache, an L3 cache, and the like.

The example graphics processing system 112 includes one or both of a local shader 116 for performing shading operations on vertices received from the input assembler 113 and a hull shader 120 that operates on patches (or the control points of patches) received from the input assembler 113. The local shader 116 and the hull shader 120 operate in object space. In some variations, the hull shader 120 is able to generate tessellation factors that are used for tessellating the patches, as well as other patch parameters or constants. In some embodiments, the local shader 116 or the hull shader 120 are implemented as software running on one or more hardware components such as processors, processor cores, compute units, and the like. Some embodiments of the example graphics processing system 112 include other shaders or different combinations of shaders that are used to perform similar functionality to the local shader 116 and the hull shader 120.

In some variations, the graphics processing system 112 can further include a tessellator 125 for processing high-order primitives. When present, the tessellator 125 receives objects (such as patches) from the hull shader 120 and generates information identifying primitives corresponding to the input object, e.g., by tessellating the input objects based on tessellation factors provided to the tessellator 125 by the hull shader 120. The primitives can include points, lines, triangles, quadrilaterals, or other polygons. Tessellating an input patch can include generating domain locations and topology such as points, lines, or triangles that represent the input patch. The tessellator 125 therefore operates in object space. In some variations, the tessellator 125 implements a plurality of tessellation engines (not shown in FIG. 1) that are able to generate a plurality of primitives concurrently or in parallel. For example, the tessellation engines can independently generate primitives based on the objects and tessellation factors received from the hull shader 120, as discussed in detail below. Some embodiments of the tessellator 125 are implemented as fixed function hardware that is configured to perform the tessellation. However, the tessellator 125 can also be implemented in other hardware, firmware, software, or combinations thereof.

The tessellator 125 provides integer indices to a conversion block 130. The integer indices provided by the tessellator 125 indicate positions of points or vertices generated by the tessellator. The integer indices are typically referred to as "grid (u, v)" coordinates. The conversion block 130 transforms the grid (u, v) values into patch coordinates (u, v) within a range [0 . . . 1]. The patch coordinates (u, v) define an exact position of a point or a vertex in an internal patch parametric space. These coordinates can be used for calculation of subdivision vertex geometry coordinates in 3D view space. The coordinates in 3-D view space are referred to as (x, y, z, w) hereinafter, in accordance with common usage in the art. In the illustrated embodiment, a positional domain shader (DS_POS) 131 receives the patch coordinates (u, v) from the conversion block 130. The positional domain shader 131 applies a function (such as a $2^{nd}$ degree polynomial or a $3^{rd}$ degree polynomial) to the patch coordinates (u, v) to generate the vertex parameters that represent the position of the vertex, e.g., the parameters (x, y, z, w). The parameters generated by the positional domain shader 131 are then stored in the cache 115 for subsequent access by other entities in the example graphics processing system 112.

The tessellator 125 also provides vertices indicative of primitives to a primitive assembler 135. Variations of the tessellator 125 that include multiple tessellation engines can provide multiple sets of vertices indicative of multiple primitives to the primitive assembler 135 concurrently or in parallel. The primitive assembler 135 assembles primitives from the provided vertices and performs one or more culling processes to remove primitives from the pipeline that will not have any effect on the final image produced by the example graphics processing system 112. For example, primitives that are too small to influence the value of a pixel or only affect the value of a pixel that is outside a bounding box of the screen are trivially discarded by the primitive assembler 135. For another example, the primitive assembler 135 can cull primitives that are facing away from the viewpoint used to generate the image that will be produced on the screen using backface culling techniques. In some variations, the primitive assembler 135 can also implement other discard, culling, scissoring, or clipping techniques.

The primitive assembler 135 selectively routes primitives to rasterizers of different areas based on areas of the primitives. The primitive assembler 135 compares the areas of the primitives to a threshold area that represents a number of pixels in the screen. For example, the threshold area can correspond to a 2×2 arrangement of pixels. The area of the primitives can be represented by a minimum area of a bounding box that is necessary to encompass the primitive. If the area of the primitive is smaller than or equal to the threshold area, the primitive assembler 135 routes the primitive to one of a plurality of small rasterizers (not shown in FIG. 1 in the interest of clarity), which are configured to operate on primitives that are encompassed by smaller bounding boxes such as a 2×2 pixel bounding box. For example, the range of input coordinates needed to represent the primitives provided to the small rasterizers (and intermediate results generated by the second rasterizers) is represented by a small number of bits, e.g., 10-20 bits for a threshold area that corresponds to a 2×2 pixel bounding box. The plurality of smaller rasterizers operate on the primitives concurrently or in parallel. For example, each smaller rasterizer enumerates one or more pixels inside the primitives (which can be referred to as a subdivision quadrilateral, SDQ), interpolates the (u, v, z) values for the pixels, and populates a set of output fragments with the rasterized pixels. Although the primitive assembler 135 is described as including large rasterizers and small rasterizers (and routing primitives to the large or small rasterizers based on a single threshold area), some variations of the primitive assembler 135 can include more than two different sizes of rasterizers. In these variations, the primitive assembler 135 routes primitives to the different sizes of rasterizers based upon comparisons of the area of the primitive to multiple different threshold areas.

A scan converter 140 receives micropolygons or fragments from the plurality of small rasterizers implemented in the primitive assembler 135. The fragments are provided to the scan converter 140 concurrently or in parallel. The scan converter 140 is able to perform scan conversion to convert polygons into pixels representative of the polygons. For example, the scan converter 140 can process the received fragments to generate output fragments at a rate of eight or more pixels per clock cycle, which are then provided to an attribute domain shader (DS_ATTR) 145. In some variations, the attribute domain shader 145 receives patch information from the input assembler 113. The attribute domain shader 145 is able to utilize the received fragments (and, if available, information from the input assembler 113) to compute a normal to a received fragment (or pixel), a color value for the fragment (or pixel), texture coordinates of the fragment (or pixel), or other attributes of the fragment (or pixel). The attribute shaded fragments (or pixels) are then provided to a pixel shader 150, which can perform operations on input fragments (or pixels) such as lighting, but mapping, shadowing, determining translucency, and the like. The pixel shader 150 therefore operates in rasterized image space. In some variations, the scan converter 140, the attribute domain shader 145, or the pixel shader 150 bypass some or all of the aforementioned operations because the operations have already been performed by the small rasterizers, as discussed herein.

If the primitive assembler 135 determines that the area of the primitive is larger than the threshold area, the primitive assembler 135 routes the primitive to a relatively large rasterizer 155, which is implemented using sufficient hardware to perform operations on primitives that are encompassed by bounding boxes larger than 2×2 pixels. For example, the larger primitives can be represented by input coordinates in image space within a range represented by 16 to 24 bits. Consequently, in this example, the large rasterizer 155 is able to operate on intermediate results within a range represented by 40 to 48 bits. In some variations, the primitive assembler 135 provides one primitive per clock cycle to an attribute domain shader 160 implemented in the large rasterizer 155. The attribute domain shader 160 can optionally be implemented using the same hardware, firmware, or software used to implement the attribute domain shader 145.

In some variations, the attribute domain shader 160 receives patch information from the input assembler 113. The attribute domain shader 160 is able to utilize the received primitives (and, if available, information from the input assembler 113) to compute attributes of the primitives such as a normal, a color value, texture coordinates, and the like. The attributes are then stored in the cache 115.

A scan converter 165 also receives primitives from the primitive assembler 135. In some variations, the scan converter 165 is implemented using the same hardware, firmware, or software that is used to implement the scan converter 140. As discussed herein, the scan converter 165 can process the received primitives and generate pixels (optionally after performing depth testing on the pixels) that are provided to a pixel shader 170 at a predetermined pixel rate. The pixel shader 170 shades pixels using primitive attributes retrieved from the cache 115. Shading the pixels or rasterized primitives includes operations such as interpolating values representative of the color or brightness at the pixel from corresponding values defined at vertices of the corresponding primitive, which are combined with textures or other data according to one or more algorithms implemented by the shader. The pixel shader 170 therefore operates in rasterized image space. In some variations, the pixel shader 170 is implemented using the same hardware, firmware, or software that is used to implement the pixel shader 150.

Figure 2:
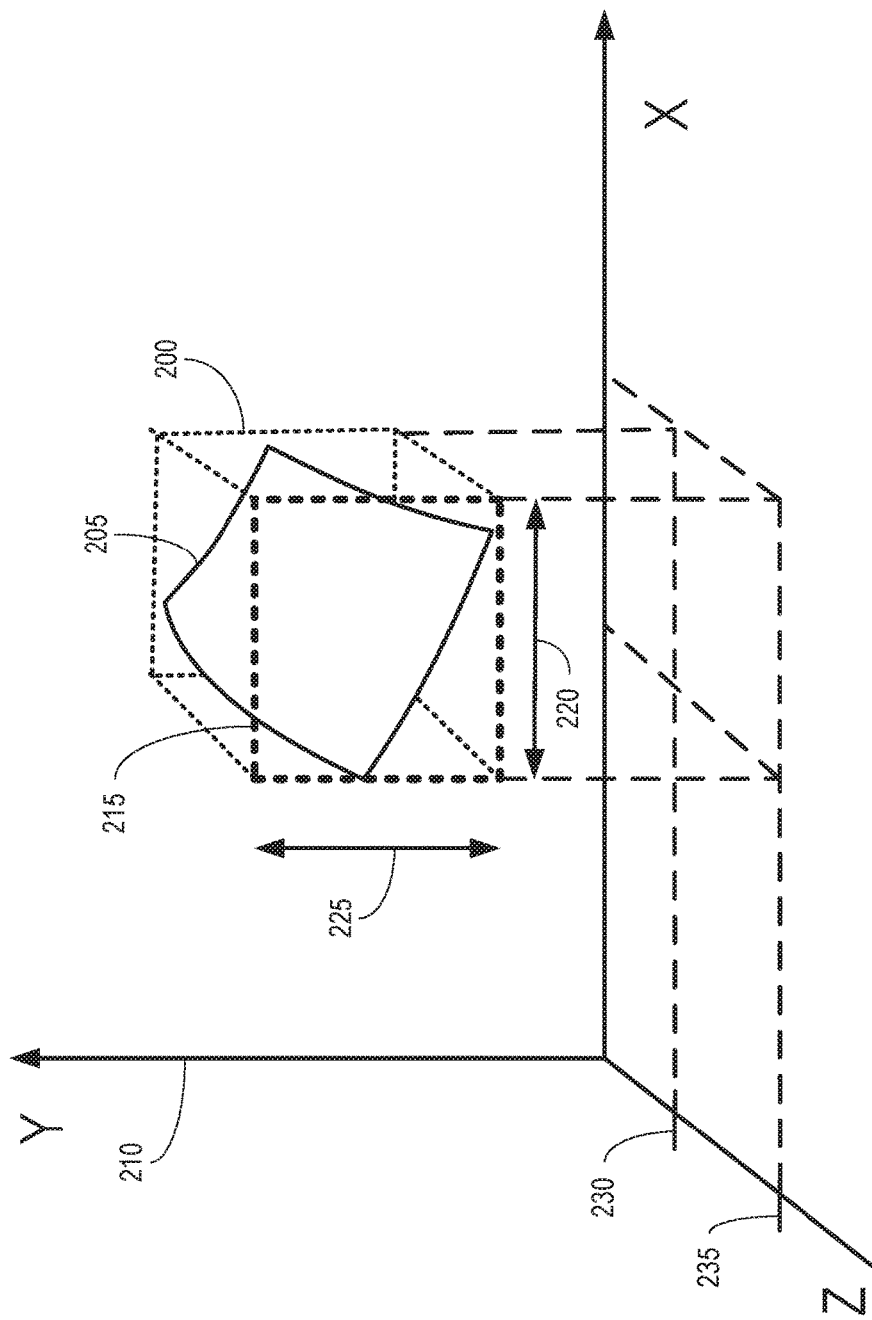
FIG. 2 is a diagram of an example bounding volume that is used to determine a bounding box and depth values for an object according to some embodiments.

FIG. 2 is a diagram of an example bounding volume 200 that is used to determine a bounding box and depth values for an object 205 according to some embodiments. For example, the bounding volume 200 determines a bounding box and depth values for an object 205 such as a patch that provided by the input assembler 113 shown in FIG. 1 or a primitive that is rasterized using the small rasterizers implemented in the primitive assembler 135 or the large rasterizer 155 shown in FIG. 1. The bounding volume 200 is depicted in a coordinate system 210 that is oriented so that the X-coordinate and the Y-coordinate are in the plane of a screen that is used to display the rendered image of the object 205. The Z-coordinate of the coordinate system 210 is oriented to indicate distance from a viewpoint of a virtual camera that is used to render the image of the object 205. In some embodiments, the origin of the coordinate system 210 corresponds to a location of the virtual camera.

A bounding box 215 (indicated by the bold, dotted lines) is defined by a range 220 of X-coordinates spanned by the projection of the object 205 into the X-Y plane of the screen and a range 225 of Y-coordinates spanned by the projection of the object 205 into the X-Y plane of the screen. The depth values for the object 205 include a near-z value 230 that represents the Z-coordinate of the portion of the object 205 that is closest to the viewpoint of the virtual camera and a far-z value 235 that represents the Z-coordinate of the portion of the object 205 that is furthest from the viewpoint of the virtual camera. As discussed herein, the bounding box 215 can be represented by an arrangement of pixels. The area of a primitive can then be compared to a threshold area that corresponds to the bounding box 215 to selectively route the primitive to different rasterizers.

Figure 3:
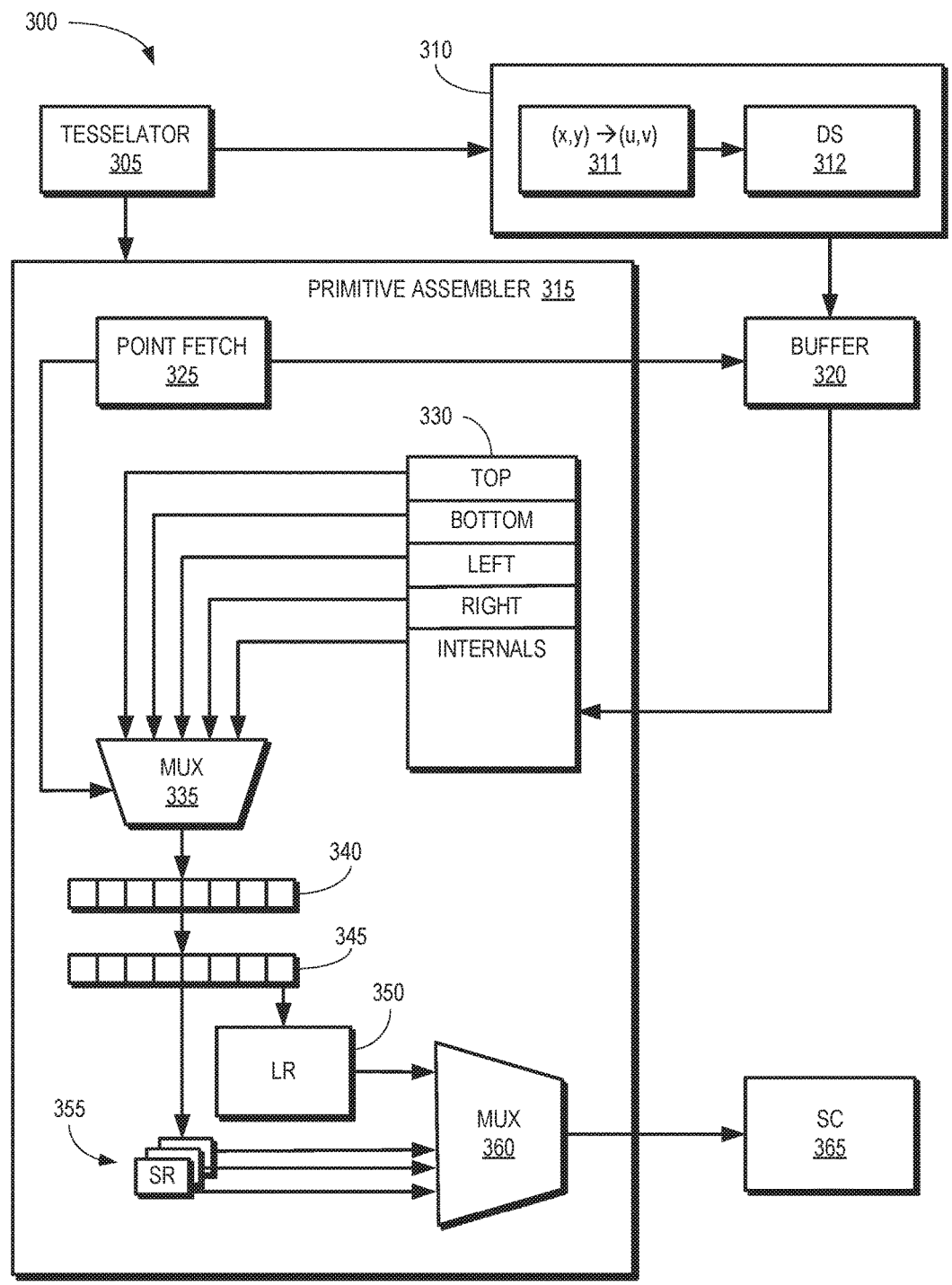
FIG. 3 is a block diagram of a first example of a portion of a graphics processing system according to some embodiments.

FIG. 3 is a block diagram of a first example of a portion 300 of a graphics processing system according to some embodiments. The portion 300 includes a tessellator 305 such as the tessellator 125 shown in FIG. 1. Some variations of the tessellator 305 are therefore able to generate information identifying primitives corresponding to the input object, e.g., by tessellating input objects based on tessellation factors. The information identifying the primitives includes information defining points or vertices associated with the primitives and information characterizing polygons such as quadrilaterals. The information defining the points or vertices is provided to a shader 310. For example, the tessellator 305 can provide information defining eight points or vertices per clock cycle to the shader 310. The information characterizing polygons such as quadrilaterals is provided to a primitive assembler 315, which corresponds to the primitive assembler 135 shown in FIG. 1. For example, the tessellator 305 can provide information characterizing eight quadrilaterals per clock cycle to the primitive assembler 315.

The shader 310 includes a transform element 311 to transform the vertex parameters that represent the position of the point or vertex, e.g., the parameters (x, y), to patch coordinates (u, v). A domain shader 312 in the shader 310 is used to perform the shading operations on the points or vertices before providing the points or vertices to a buffer 320. In some variations, the buffer 320 is implemented in a memory such as the memory 114 shown in FIG. 1 or a cache such as the cache 115 shown in FIG. 1. Vertices on the edge of a patch are indexed differently from vertices that are internal to the patch in some embodiments and so the different vertices are referenced using different base addresses in memory and the buffer 320. The addresses of the edge vertices and internal vertices are referred to herein as "Top," "Bottom," "Left," "Right," and "Internals."

The primitive assembler 315 includes a point fetch block 325 that can retrieve information defining points or vertices from the buffer 320. For example, the point fetch block 325 can provide addresses for points or vertices that are stored in the buffer 320 as well as an instruction or request that causes the buffer 320 to provide the requested points or vertices to a set of registers 330 implemented in the primitive assembler 315. The registers 330 are associated with the different types of vertices, e.g., "Top," "Bottom," "Left," "Right," and "Internals." The point fetch block 325 also provides a control signal to a multiplexer 335 that receives information from the registers 330 as input. The value of the control signal determines the input (e.g., the contents of one of the registers 330) that is output by the multiplexer 335.

The information output from the multiplexer 335 is provided to culling blocks 340 that perform backface culling on the quadrilaterals provided to the primitive assembler 315 by the tessellator 305. Some embodiments of the culling blocks 340 are also configured to perform other types of culling, clipping, scissoring, and the like. The quadrilaterals that survive the culling process are emitted from the block 340 to bounding box reduction blocks 345. Areas of the quadrilaterals are compared to a threshold area that is indicated by a number and arrangement of pixels. For example, the areas of the quadrilaterals can be compared to a 2×2 arrangement of pixels. Quadrilaterals that are larger than the threshold area are provided to a large rasterizer (LR) 350 for rasterization. Quadrilaterals that are smaller than the threshold area have their bounding boxes reduced to dimensions that correspond to the threshold area. For example, the bounding boxes of quadrilaterals that are smaller than the 2×2 arrangement of pixels can be reduced to dimensions of 2×2. Bounding box reduction can also include subtracting a value of an origin of the bounding box from the coordinates of the vertices of the quadrilateral.

After bounding box reduction, the quadrilaterals that are smaller than the threshold area are provided to a plurality of small rasterizers 355, which are capable of rasterizing the small quadrilaterals concurrently or in parallel. For example, the primitive assembler 315 can include small rasterizers 355 that are configured to rasterize eight quadrilaterals in parallel. The pixels produced by rasterizing the large quadrilaterals in the large rasterizer LR 350 and rasterizing the small quadrilaterals in the small rasterizers SR 355 are then provided to a multiplexer 360, which merges the pixel streams into a single stream. The merged pixel stream is provided to a scan converter 365, which corresponds to some embodiments of the scan converters 140, 165 shown in FIG. 1. Although the large rasterizer LR 350 and the small rasterizers SR 355 handle separate streams of quadrilaterals in the embodiment shown in FIG. 3, some variations of the large rasterizer 350 are implemented in series with the small rasterizers SR 355, as discussed below. In that case, the large rasterizer LR 350 bypasses performing some or all rasterization operations on pixels generated by the small rasterizers SR 355.

Figure 4:
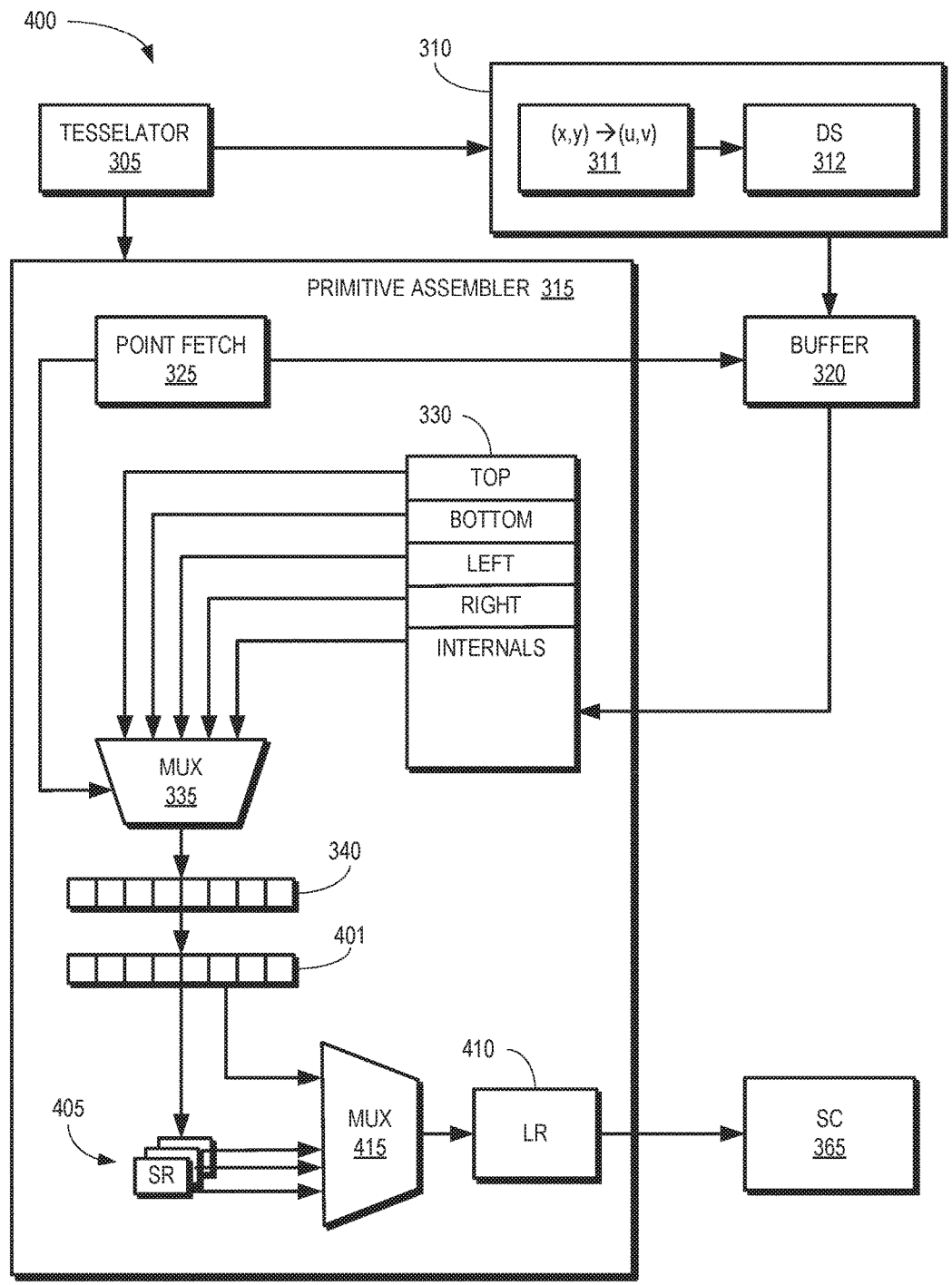
FIG. 4 is a block diagram of a second example of a portion of a graphics processing system according to some embodiments.

FIG. 4 is a block diagram of a second example of a portion 400 of a graphics processing system according to some embodiments. The portion 400 includes several entities that are similar to, or the same as, corresponding entities in the first example of the portion 300 shown in FIG. 3. These entities are indicated by the same reference numerals. For example, the portion 400 includes a tessellator 305, a shader 310, a primitive assembler 315, a buffer 320, a point fetch block 325, a set of registers 330, a multiplexer 335, a culling block 340, and a scan converter 365.

The portion 400 differs from the portion 300 shown in FIG. 3 because the portion 400 includes a plurality of small rasterizers 405 that are implemented in series with a large rasterizer 410. The portion 400 therefore includes a bounding box reduction block 401 that selectively routes primitives to the small rasterizers 405 or a multiplexer 415 based on a comparison of the area of the primitive to a threshold area. Quadrilaterals that are larger than the threshold area are provided directly to the multiplexer 415. Quadrilaterals that are smaller than the threshold area have their bounding boxes reduced to dimensions that correspond to the threshold area by the bounding box reduction block 401. For example, the bounding boxes of quadrilaterals that are smaller than the 2×2 arrangement of pixels can be reduced to dimensions of 2×2. Bounding box reduction can also include subtracting a value of an origin of the bounding box from the coordinates of the vertices of the quadrilateral.

After bounding box reduction, the quadrilaterals that are smaller than the threshold area are provided to a plurality of small rasterizers 405, which are capable of rasterizing the small quadrilaterals concurrently or in parallel. For example, the primitive assembler 315 can include a small rasterizers 405 that are configured to rasterize eight quadrilaterals in parallel. The pixels produced by rasterizing the small quadrilaterals in the small rasterizers 405 are then provided to a multiplexer 360, which merges the rasterized pixel streams generated by the small rasterizers 405 and the large quadrilaterals into a single stream, which is then provided to the large rasterizer 410. Large quadrilaterals in the stream are rasterized by the large rasterizer 410 to generate pixels. The large rasterizer 410 bypasses performing some or all operations on the pixel streams generated by the small rasterizers 405 since the small rasterizers 405 have already done some or all of the necessary rasterization. The large rasterizer 410 then outputs a pixel stream that is provided to the scan converter 365.

Figure 5:
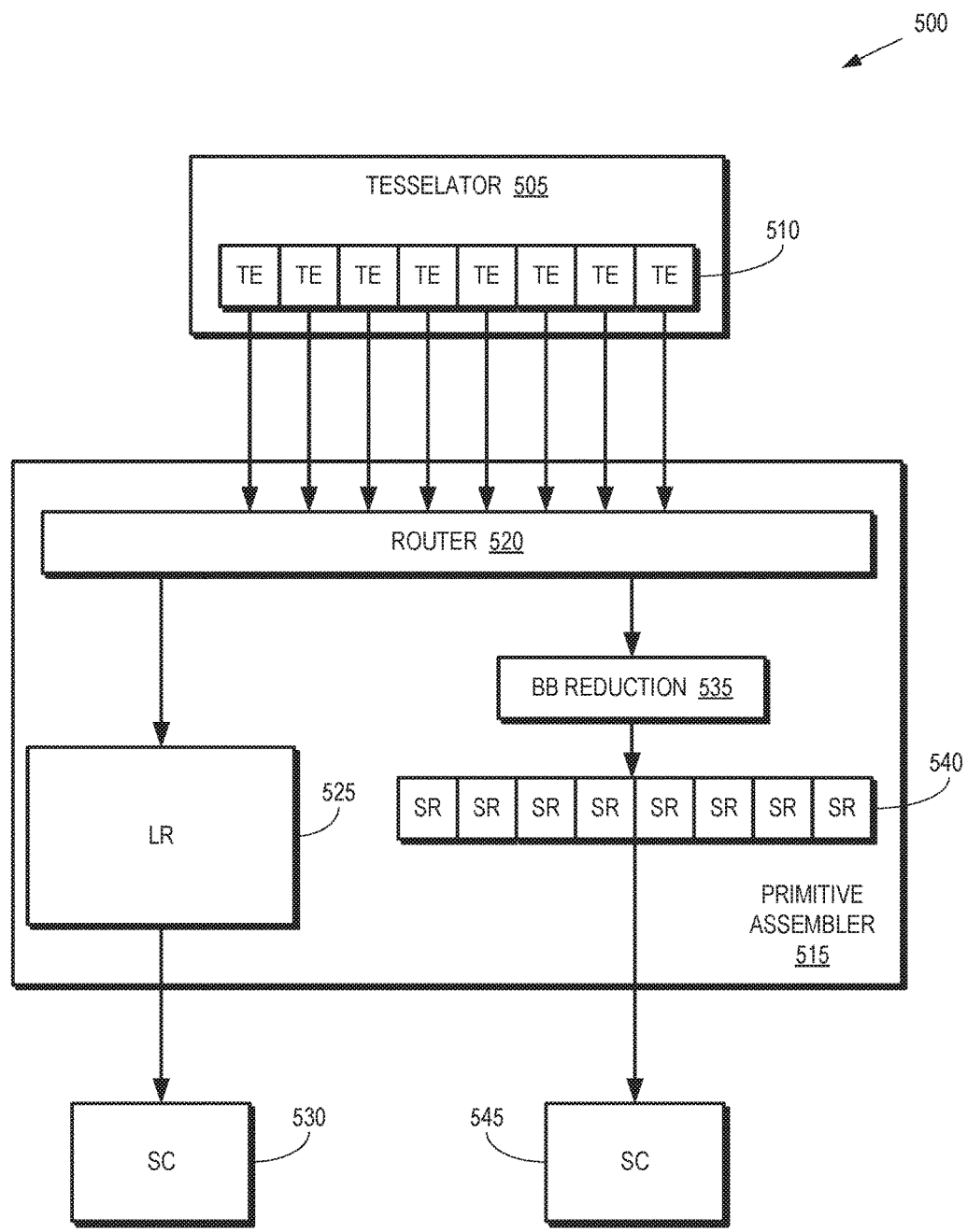
FIG. 5 is a block diagram of a portion of a graphics processing system that includes a tessellator with multiple tessellation engines according to some embodiments.

FIG. 5 is a block diagram of a portion 500 of a graphics processing system that includes a tessellator 505 with multiple tessellation engines 510 according to some embodiments. The portion 500 can be used to implement corresponding portions of the example graphics processing system 112 shown in FIG. 1. Only one of the tessellation engines 510 is indicated by a reference numeral in the interest of clarity. The tessellator 505 receives a stream of input objects such as patches generated by an input assembler. Each of the tessellation engines (TE) 510 is able to independently tessellate an input object based on a set of tessellation factors. The tessellation engines 510 can therefore tessellate a plurality of input objects concurrently or in parallel to generate multiple primitives per clock cycle. The primitives generated by the tessellation engines 510 are then provided to a primitive assembler 515.

A router 520 receives the primitives generated by the tessellation engines 510. For example, the router 520 can receive eight quadrilaterals per clock cycle from the tessellation engines 510. The router 520 is configured to compare areas of the quadrilaterals to a threshold area and then selectively route the quadrilaterals based on the comparison. Quadrilaterals that are larger than the threshold area are routed to a large rasterizer 525 that is configured to rasterize the received quadrilaterals and provide a pixel stream to a scan converter 530, as discussed herein. Quadrilaterals that are smaller than the threshold area are routed to a bounding box reduction block 535 that is configured to reduce the bounding boxes of the quadrilaterals to dimensions that correspond to the threshold area. The bounding box reduction block 535 then provides the quadrilaterals with the reduced bounding boxes to one of a plurality of small rasterizers 540 for rasterization. The small rasterizers 540 can rasterize the received quadrilaterals concurrently or in parallel, which allows the primitive assembler 515 to process a higher volume of quadrilaterals. The pixel stream generated by the small rasterizers 540 is provided to a scan converter 545, which can be the same or different than the scan converter 530 in different variations. Selectively routing the small quadrilaterals to the small rasterizers 540 therefore increases the throughput of the primitive assembler 515 and reduces the likelihood that the primitive assembler 515 becomes a bottleneck in the graphics processing system that implements multiple tessellation engines 510.

Figure 6:
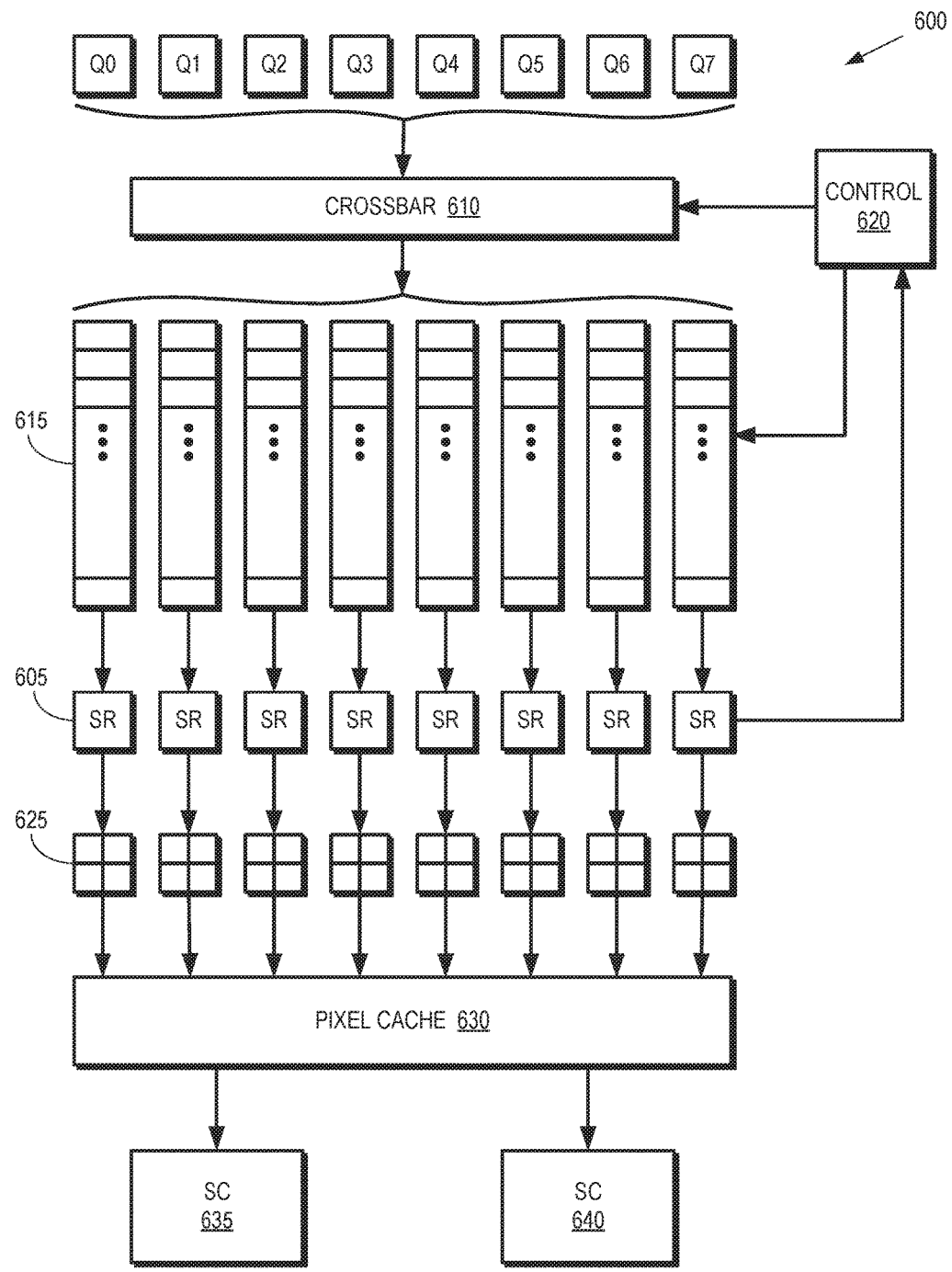
FIG. 6 is a block diagram of a parallel rasterizer according to some embodiments.

FIG. 6 is a block diagram of a parallel rasterizer 600 according to some embodiments. The parallel rasterizer 600 includes a plurality of small rasterizers 605 for rasterizing input primitives. In the interest of clarity, only one of the small rasterizers 605 is indicated by a reference numeral. The parallel rasterizer 600 can be used to implement some embodiments of the small rasterizers 355 shown in FIG. 3, the small rasterizers 405 shown in FIG. 4, and the small rasterizers 540 shown in FIG. 5. The eight small rasterizers 605 in the parallel rasterizer 600 operate simultaneously, concurrently, or in parallel on eight primitives, which are referred to as subdivision quadrilaterals in some variations. For example, the small rasterizers 605 can operate on a corresponding number of input quadrilaterals Q0, Q1, Q2, Q3, Q4, Q5, Q6, Q7. The eight small rasterizers 605 are capable of generating eight pixels per clock cycle from single-pixel quadrilaterals. However, the number of small rasterizers can be larger or smaller so that some embodiments of the parallel rasterizer 600 can process larger or smaller numbers of input primitives per clock cycle.

A crossbar switch 610 distributes the input quadrilaterals to a corresponding number of queues 615 (only one queue 615 is indicated by a reference numeral in the interest of clarity). The depth of the queues 615 is chosen to compensate for the latency required to process the input quadrilaterals. For example, processing of the bounding box for each quadrilateral can take up to four clock cycles for a 4×4 bounding box and up to 16 clock cycles for an 8×8 bounding box. The queues 615 can therefore be configured with a depth of four entries to hold four pending quadrilaterals with 4×4 bounding boxes and a depth of 16 entries to hold 16 pending quadrilaterals with 8×8 bounding boxes.

A control unit 620 can provide signaling to the crossbar switch 610 and one or more of the queues 615 to cause one or more input quadrilaterals to be provided to corresponding queues 615. In some variations, the control unit 620 is constrained to push only one quadrilateral onto each of the queues 615 per clock cycle. The control unit 620 receives feedback information from the small rasterizers 605 such as information indicating that the small rasterizers 605 have completed rasterizing a quadrilateral and are available to retrieve a new quadrilateral from a corresponding one of the queues 615. The available small rasterizer 605 retrieves a quadrilateral from the corresponding queues 615. The control unit 620 uses the received feedback information to generate the signaling required to cause the crossbar switch 610 to provide a quadrilateral to the queue 615 that provided the quadrilateral to the available small rasterizer 605.

Each of the small rasterizers 605 is configured to receive a quadrilateral and configure a set of functionals for the quadrilateral. As used herein, the term "functional" refers to a linear function that defines a portion of a quadrilateral. For example, a half plane functional is an expression describing a half plane or a line, which can be used to represent an edge of the quadrilateral. Four functionals are used to represent the four external edges of a quadrilateral. One additional functional is used to represent a diagonal of the quadrilateral. A coverage mask is then determined based on the functionals for the quadrilateral being processed by the small rasterizer 605. For example, the small rasterizer 605 can configure a coverage mask for 2×2 sets of pixels (quads 625, only one indicated by a reference numeral in the interest of clarity), which requires extending the half plane of each functional by the area of a pixel. The small rasterizer 605 also prepares gradients of the coordinates (u, v, z) to perform interpolation of characteristics such as texture values. The small rasterizer 605 then enumerates covered 2×2 quads 625 and uses values of the functionals within the 2×2 quads 625 to compose the coverage mask. The small rasterizer 605 also evaluates values of the coordinates (u, v, z).

Each of the small rasterizers 605 outputs a 2×2 quad 625, a 4-bit coverage mask, and four sets of values of the coordinates (u, v, z) to a pixel cache 630 during each clock cycle. The values generated by the small rasterizer 605 are cached in the pixel cache 630. In the illustrated embodiment, up to eight 2×2 pixel quads are added to the pixel cache 630 in each clock cycle. The pixel cache 630 can therefore implement a banking scheme to accommodate this flow of pixel quads. In some cases, one or more of the quads 625 that are provided to the pixel cache 630 overlap and complement each other. The pixel cache 630 can therefore be configured to sort the quads 625 and check for overlapping quads 625. In some variations, the pixel cache 630 is implemented using 4×2 pixel tiles. The pixel cache 630 also implement an eviction policy such as overwriting to a 4×2 tile with different coordinates, evicting if the cache is out of space, full 4×2 coverage mask, and idle clock on output interface. The 4×2 pixel tiles in the pixel cache 630 can be retrieved by, or provided to, one or more scan converters 635, 640, which performs operations such as occlusion culling on the pixels based on depth values (z) of the pixels.

Some embodiments of the small rasterizers 605 are configured to operate according to a rasterizer algorithm such as the rasterizer algorithm described in the following pseudo-code:

```
template <int _H, int _V, int >
bool rasterizer (quad &prim, edge_f &edge, int32 *det,
                 int clock, pixels<_V, _H> &outPix) {
    // setup //  v0-----v1
    //  |  + / |
    //  |   /  |
    //  |  /   |
    //  | / -  |
    //  |/     |
    //  v2-----v3

| x1  x2  x |
    f<v1, v2>(x, y) = | y1  y2  y |
                    | 1   1   1 |

// the v1->v2 functional is used for both triangles; its sign determines
    // triangle affiliation while the walk is done using exterior edges
    // vertex of a flipped triangle is moved onto the internal edge
    edge_f v1v2 (prim.v [1], prim.v [2]);
    edge_f v2v1 (prim.v [2], prim.v [1]);
    if (!v1v2.right) {
        // rotate to always have A in f<v1,v2>(x,y) positive
        // needed?
        swap (prim.v [1], prim.v [2]);
        swap (prim.v [0], prim.v [3]);
        v1v2 = edge_f (prim.v [1], prim.v [2]); // or just negate the functional
    }
    edge_f edge [6];
    edge [4] = v1v2.right ? v1v2 : v2v1;
    edge [5] = v1v2.right ? v2v1 : v1v2;
    int32 det [2];
```

```
det [0] = edge [4] . eval (prim.v [0]);
det [1] = edge [5] . eval (prim.v [3]);
int32 v0_sign = det [0] > 0; // check for 0 area too
int32 v3_sign = det [1] > 0;
// calculate edge functionals
edge [0] = v0_sign?         edge_f (prim.v [2], prim.v [0]) :    //  v2v0
                            edge_f (prim.v [2], prim.v [1]);     //  null triangle
edge [1] = v0_sign?         edge_f (prim.v [0], prim.v [1]) :    //  v0v1
                            edge_f (prim.v [2], prim.v [1]);     //  null triangle
edge [2] = v3_sign?         edge_f (prim.v [1], prim.v [3]) :    //  v1v3
                            edge_f (prim.v [1], prim.v [2]);     //  null triangle
edge [3] = v3_sign?         edge_f (prim.v [3], prim.v [2]) :    //  v3v2
                            edge_f (prim.v [1], prim.v [2]);     //  null triangle
// position the seed on the grid
// find 2x2 tile origin and area in 2 × 2 tiles
prim.area.x      += prim.origin.x + _H - 1;
prim.size.y      += prim.origin.x + _H - 1;
prim.origin.x    &= POS_FRAC_MASK & POS_ODD_MASK;
prim.origin.y    &= POS_FRAC_MASK & POS_ODD_MASK;
prim.size.x      -= prim.origin.x;
prim.size.y      -= prim.origin.x;
prim.size.x      /= _H;
prim.size.y      /= _V;
// calculate the seed for all four functionals
int32 seed [5];
for (int i = 0; i < 5; i ++) {
    // prepare seeds
    seed [i] = edge [i].c;
    // correct seeds to evaluate 2x2 tiles
    if (i >= 4)
      break;
    if ( edge [i].quadrant & 1) seed [i] += a * (_H - 1);
    if ( edge [i].quadrant & 2) seed [i] += b * (_V - 1);
    if (!edge [i].right)        seed [i] --;                                       // left edge
excluded
}
// setup gradients for both triangles
gradient<24,4>   du_0      (prim.v   [0],   prim.v   [1],   prim.v   [2],   POS_PARAM_U,
                            edge     [1],   edge     [4],   edge     [0],   det [0]);
gradient<24,4>   dv_0      (prim.v   [0],   prim.v   [1],   prim.v   [2],   POS_PARAM_V,
                            edge     [1],   edge     [4],   edge     [0],   det [0]);
gradient<24,4>   dz_0      (prim.v   [0],   prim.v   [1],   prim.v   [2],   POS_PARAM_Z,
                            edge     [1],   edge     [4],   edge     [0],   det [0]);
gradient<24,4>   du_1      (prim.v   [2],   prim.v   [1],   prim.v   [3],   POS_PARAM_U,
                            edge     [5],   edge     [2],   edge     [3],   det [0]);
gradient<24,4>   dv_1      (prim.v   [2],   prim.v   [1],   prim.v   [3],   POS_PARAM_V,
                            edge     [5],   edge     [2],   edge     [3],   det [0]);
gradient<24,4>   dz_1      (prim.v   [2],   prim.v   [1],   prim.v   [3],   POS_PARAM_Z,
                            edge     [5],   edge     [2],   edge     [3],   det [0]);
// calculate the tile coverage mask
uint32 t_cnt = 0;                                                                   // counter for
valid tiles
bool *t_mask = new bool (prim.size.x * prim.size.y);
for (int i = 0; i < prim.size.x; i ++)
   for (int j = 0; i < prim.size.y; y ++) {
      for (int k = 0; !k || (t_mask [i * prim.size.x+ j] && k < 4); k ++)
         t_mask * [i * prim.size.x+ j] = seed [k] +
                                 edge [k].a * j * _H +
                                 edge [k].b * i * _V;
      t_cnt += t_mask * [i * prim.size.x + j];
   }
// end of setup
//
// now per-clock actions
// first of all, get to the correct 2x2 tile
for (int i = 0, cnt = 0; i < prim.size.x; i ++)
   for (int j = 0; i < prim.size.y; y ++)
      if (t_mask [i * prim.size.x + j]) {
         if (clock == cnt ++) {
            offset.x = j * _H;
            offset.y = i * _V;
            i = prim.size.x; // end the outer loop
            break;
         }
      }
```

```
// seed the functionals
int32 tile_seed [5];
bool valid = true;
for (int k = 0; k < 5 ; k ++) { // loop through functionals
    tile_seed [i] = edge [i].eval (offset);
    if (i < 4 && tile_seed < 0)
        valid = false;
}
position offset, reverse; // offset is for v0v1v2, reverse is for v1v2v3
// calculate parameters for the tile
offset.u       = du_0.eval (offset);
offset.v       = dv_0.eval (offset);
offset.z       = dz_0.eval (offset);
reverse.u      = du_1.eval (offset);
reverse.v      = dv_1.eval (offset);
reverse.z      = dz_1.eval (offset);
// prepare output
outPix.origin = offset;
outPix.p [0].mask      = valid;
outPix.p [0].u         = tile_seed [4] > 0 ? offset.u : reverse.u;
outPix.p [0].v         = tile_seed [4] > 0 ? offset.v : reverse.v;
outPix.p [0].z         = tile_seed [4] > 0 ? offset.z : reverse.z;
for (int i = 0, ix = 0; i < _V; i ++)
    for (int j = 0; j < _H; j ++, ix ++) {
        if (!ix)
            continue;                                    // corner pixel is the seed
        outPix.p [ix].mask = true;
        for (int k = 1; outPix.p [ix].mask && k < 4; k ++)
            outPix.p [ix].mask = tile_seed [k] + edge [k].a * i + edge [k].b * j > 0;
        // only evaluate parameters for covered pixels
        if (outPix.p [ix].mask) {
            bool side = tile_seed [4] + edge [4].a * i + edge [4].b * j > 0;
            outPix.p [ix].u        = side ? du_0.a * i + du_0.b * i + offset.u :
                                            du_1.a * i + du_1.b * i + reverse.u;
            outPix.p [ix].v        = side ? dv_0.a * i + dv_0.b * i + offset.v :
                                            dv_1.a * i + dv_1.b * i + reverse.v;
            outPix.p [ix].z        = side ? dz_0.a * i + dz_0.b * i + offset.z :
                                            dz_1.a * i + dz_1.b * i + reverse.z;
        }
    }
return clock >= t_cnt - 1;
};
```

Figure 7:
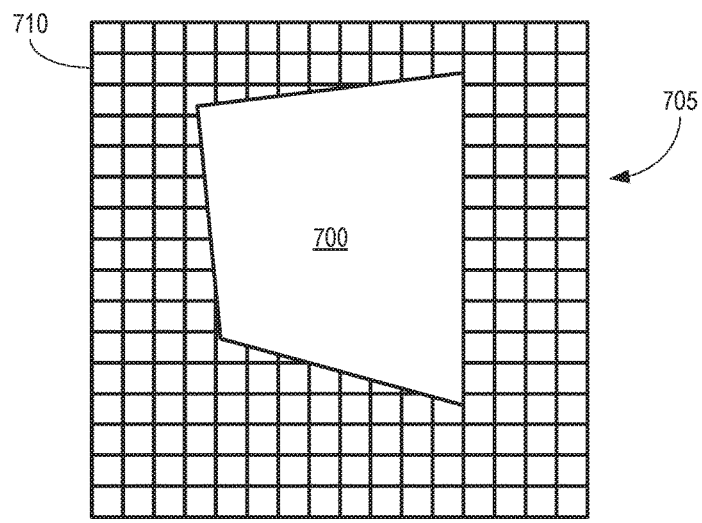
FIG. 7 is an illustration of a large primitive and a corresponding large bounding box according to some embodiments.

FIG. 7 is an illustration of a large primitive 700 and a corresponding large bounding box 705 according to some embodiments. The primitive 700 is a quadrilateral that can be generated by a tessellator such as the tessellator 125 shown in FIG. 1 and provided to a primitive assembler such as the primitive assembler 135 shown in FIG. 1. The bounding box 705 is defined by an arrangement of pixels 710 (only one indicated by a reference numeral in the interest of clarity) that encompasses the primitive 700. For example, the bounding box 705 is defined by a 16×16 arrangement of pixels 710. The area of the primitive 700 exceeds a threshold area, such as the threshold area used by the primitive assembler 135 shown in FIG. 1 to selectively route primitives to a large rasterizer or a set of small rasterizers. Consequently, the primitive 700 is routed to a large rasterizer that is configured to process primitives encompassed by larger bounding boxes.

Figure 8:
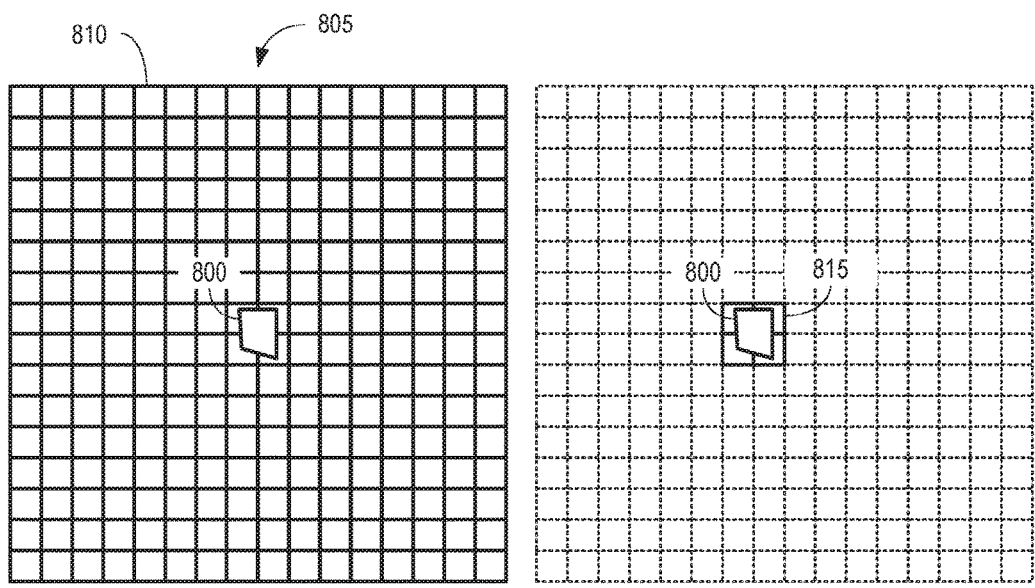
FIG. 8 is an illustration of a small primitive and a large bounding box according to some embodiments.

FIG. 8 is an illustration of a small primitive 800 and a large bounding box 805 according to some embodiments. The primitive 800 is a quadrilateral that can be generated by a tessellator such as the tessellator 125 shown in FIG. 1 and provided to a primitive assembler such as the primitive assembler 135 shown in FIG. 1. The bounding box 805 is defined by an arrangement of pixels 810 (only one indicated by a reference numeral in the interest of clarity) that encompasses the primitive 800. For example, the bounding box 805 is defined by a 16×16 arrangement of pixels 810. The area of the primitive 800 is less than or equal to a threshold area, such as the threshold area used by the primitive assembler 135 shown in FIG. 1 to selectively route primitives to a large rasterizer or a set of small rasterizers. Consequently, the bounding box 805 is reduced to generate a reduced bounding box 815 for the primitive 800, which is then routed to one of a set of small rasterizers that is configured to process primitives encompassed by smaller bounding boxes, as discussed herein.

Figure 9:
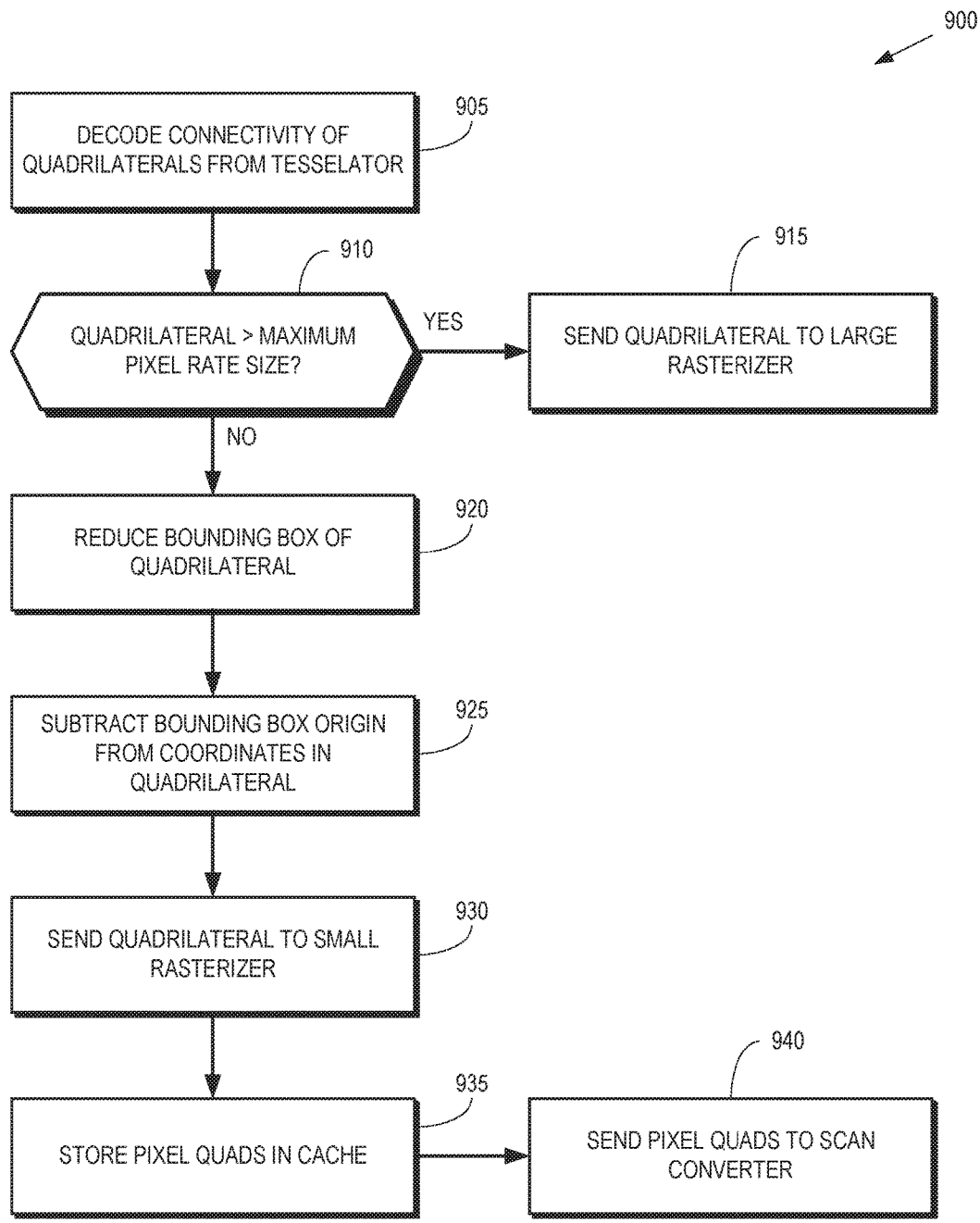
FIG. 9 is a flow diagram of a method of selectively routing primitives to large or small rasterizers on the basis of areas of the primitives according to some embodiments.

FIG. 9 is a flow diagram of a method 900 of selectively routing primitives to large or small rasterizers on the basis of areas of the primitives according to some embodiments. The method 900 is implemented in some embodiments of the primitive assembler 135 shown in FIG. 1, the primitive assembler 315 shown in FIGS. 3 and 4, or the primitive assembler 515 shown in FIG. 5.

At block 905, the connectivity of vertices of primitives such as quadrilaterals received from a tessellator is decoded to determine a position origin of a next vertex to be processed. The position origin can be a reuse of a previous value, a value of an edge position buffer, or a value in an interior position buffer. In some variations, decoding of the connectivity can be performed at eight quadrilaterals per clock rate or more.

At decision block 910, the primitive assembler determines whether the area of the quadrilateral is greater than a maximum pixel rate area. Examples of maximum pixel rate areas include pixel rates determined by a 2×2 arrangement of pixels, a 4×4 arrangement of pixels, an 8×8 arrangement of pixels, and the like. If the area of the quadrilateral is greater than the maximum pixel rate area, the quadrilateral is sent (at block 915) to a large rasterizer for rasterization. In some variations, the quadrilaterals are sent to the large rasterizer at a rate of one triangle per clock. If the area of the quadrilateral is smaller than the maximum pixel rate area, the method 900 flows to block 920.

At block 920, the bounding box of the quadrilateral is reduced. Reducing the bounding box includes reducing the number of pixels in the bounding box to a number and arrangement that corresponds to the number and arrangement that defines the maximum pixel rate area.

At block 925, an origin of the bounding box is subtracted from coordinates that represent the points in the quadrilateral. A diagonal functional can also be set up to evaluate visibility of the quadrilateral and backface culling, trivial discard, and viewport scissoring can be applied to the quadrilaterals. The quadrilaterals that survive these processes are emitted to one of a set of queues, such as the queue 615 shown in FIG. 6. The method 900 then flows to block 930.

At block 930, quadrilaterals stored in the queues are sent to corresponding small rasterizers for rasterization. The small rasterizers define edge functionals for the quadrilaterals and define parameters for interpolation of the coordinates (u, v, z). A coarse coverage mask is defined for the quadrilateral and an iterative process is performed on the coverage mask to generate 2×2 quads of pixels. Interpolated values of the coordinates (u, v, z) are generated for the 2×2 pixel quads.

At block 935, the 2×2 pixel quads are stored in a cache such as the pixel cache 630 shown in FIG. 6. For example, the pixel quads can be stored in an 8-interleaved pixel cache that uses 4×2 pixel tiles and implements a corresponding eviction policy, as discussed herein. At block 940, the pixel quads stored in the cache are sent to a scan converter, as discussed herein.

In some embodiments, the apparatus and techniques described above are implemented in a system comprising one or more integrated circuit (IC) devices (also referred to as integrated circuit packages or microchips), such as the graphics processing system described above with reference to FIGS. 1-8. Electronic design automation (EDA) and computer aided design (CAD) software tools can be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device can be stored in and accessed from the same computer readable storage medium or a different computer readable storage medium.

A computer readable storage medium can include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above can implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device may not be required, and that one or more further activities can be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
selectively routing a primitive to a first rasterizer or one of a plurality of second rasterizers, wherein the plurality of second rasterizers concurrently operate on different primitives, and wherein the primitive is selectively routed based on an area of the primitive.

2. The method of claim 1, wherein selectively routing the primitive comprises routing the primitive to the first rasterizer in response to the area of the primitive being larger than a threshold area that is based on a predetermined number of pixels.

3. The method of claim 2, wherein selectively routing the primitive comprises routing the primitive to the one of the plurality of second rasterizers in response to the area of the primitive being smaller than the threshold area.

4. The method of claim 2, wherein selectively routing the primitive to the one of the plurality of second rasterizers comprises reducing a bounding box of the primitive to the predetermined number of pixels prior to providing the primitive to the one of the plurality of second rasterizers.

5. The method of claim 4, wherein selectively routing the primitive to the one of the plurality of second rasterizers further comprises subtracting an origin of the bounding box from coordinates of points that represent the primitive prior to providing the primitive to the one of the plurality of second rasterizers.

6. The method of claim 5, wherein selectively routing the primitive to the one of the plurality of second rasterizers further comprises selectively routing the primitive to a crossbar switch that distributes the primitive to one of a plurality of queues to store values representative of characteristics of points or vertices of the primitive prior to providing the primitive to the one of the plurality of second rasterizers.

7. The method of claim 6, wherein depths of the plurality of queues are configured to compensate for latencies required to process coordinates within the reduced bounding box of the primitive.

8. The method of claim 2, wherein the threshold area corresponds to a 2×2 arrangement of pixels.

9. An apparatus, comprising:
a first rasterizer;
a plurality of second rasterizers that concurrently operate on different primitives; and
a router to selectively route a primitive to the first rasterizer or one of the plurality of second rasterizers based on an area of the primitive.

10. The apparatus of claim 9, wherein the router is to route the primitive to the first rasterizer in response to the area of the primitive being larger than a threshold area that corresponds to a predetermined number of pixels.

11. The apparatus of claim 10, wherein the router is to route the primitive to the one of the plurality of second rasterizers in response to the area of the primitive being smaller than the threshold area.

12. The apparatus of claim 11, further comprising:
a bounding box reduction block to reduce a bounding box of the primitive to the predetermined number of pixels prior to providing the primitive to the one of the plurality of second rasterizers.

13. The apparatus of claim 12, wherein the bounding box reduction block is configured to subtract an origin of the bounding box from coordinates of points that represent the primitive prior to providing the primitive to the one of the plurality of second rasterizers.

14. The apparatus of claim 13, further comprising:
a plurality of queues associated with the plurality of second rasterizers, wherein each of the plurality of queues is configured to store values representative of characteristics of points or vertices of the primitive prior to providing the primitive to a corresponding one of the plurality of second rasterizers; and
a crossbar switch to distribute the primitive to one of the plurality of queues.

15. The apparatus of claim 14, wherein depths of the plurality of queues are configured to compensate for latencies required to process coordinates within the reduced bounding box of the primitive.

16. The apparatus of claim 10, wherein the threshold area corresponds to a 2×2 arrangement of pixels.

17. The apparatus of claim 10, further comprising:
a tessellator comprising a plurality of tessellation engines to concurrently perform tessellation on input primitives to generate output primitives, and
wherein the router is configured to selectively route the output primitives to the first rasterizer or the one of the plurality of second rasterizers based on areas of the of the output primitives.

18. A method, comprising:
concurrently rasterizing a first set of primitives using a plurality of first rasterizers;
rasterizing a second set of primitives using a second rasterizer; and
wherein the first set of primitives are encompassed by reduced bounding boxes that have areas that are less than areas of bounding boxes that encompass the second set of primitives.

19. The method of claim 18, further comprising:
receiving a third set of primitives that are encompassed by bounding boxes that are larger than the reduced bounding boxes, wherein the third set includes the first set of primitives and the second set of primitives; and
reducing the bounding boxes of the first set of primitives to the reduced bounding boxes prior to concurrently rasterizing the first set of primitives using the plurality of first rasterizers.

20. The method of claim 19, wherein reducing the bounding boxes of the first set of primitives comprises subtracting an origin of the reduced bounding box from coordinates of points that represent the primitive.

* * * * *